US011675764B2

(12) United States Patent
Zheng et al.

(10) Patent No.: US 11,675,764 B2
(45) Date of Patent: Jun. 13, 2023

(54) LEARNED DATA ONTOLOGY USING WORD EMBEDDINGS FROM MULTIPLE DATASETS

(71) Applicant: Salesforce.com, Inc., San Francisco, CA (US)

(72) Inventors: Zuye Zheng, San Francisco, CA (US); Vaibhav Garg, San Francisco, CA (US); Sumitkumar Kukkar, Dublin, CA (US); Timothy Noonan, Beulah, CO (US); Evan Tsao, San Francisco, CA (US); Thushara Paul, San Francisco, CA (US); Behzad Farhang Richey, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 15 days.

(21) Appl. No.: 17/072,615

(22) Filed: Oct. 16, 2020

(65) Prior Publication Data

US 2022/0121636 A1  Apr. 21, 2022

(51) Int. Cl.
*G06F 16/22* (2019.01)
*G06F 40/284* (2020.01)
*G06F 16/28* (2019.01)
*G06F 16/29* (2019.01)
*G06F 16/2455* (2019.01)

(52) U.S. Cl.
CPC ........ *G06F 16/2237* (2019.01); *G06F 16/221* (2019.01); *G06F 16/2282* (2019.01); *G06F 16/24553* (2019.01); *G06F 16/288* (2019.01); *G06F 16/29* (2019.01)

(58) Field of Classification Search
CPC .... G06F 16/2237; G06F 16/29; G06F 16/288; G06F 16/2282; G06F 16/24533; G06F 16/221; G06F 40/284
See application file for complete search history.

(56) References Cited

U.S. PATENT DOCUMENTS

| 6,163,774 | A  | * | 12/2000 | Lore | G06Q 40/06 705/36 R |
| 6,236,986 | B1 | * | 5/2001 | Gestrelius | G06F 16/24561 |
| 6,405,187 | B1 | * | 6/2002 | Egan | G06F 16/2228 |
| 8,095,524 | B2 | * | 1/2012 | Kandogan | G06F 16/9535 707/705 |
| 8,335,778 | B2 | * | 12/2012 | Ghosh | G06F 16/367 707/708 |
| 8,700,661 | B2 | * | 4/2014 | Pfeifle | G06F 16/29 707/771 |

(Continued)

*Primary Examiner* — Miranda Le
(74) *Attorney, Agent, or Firm* — Holland & Hart LLP

(57) ABSTRACT

Techniques described herein may support a learned ontology or meaning for user, organization, or customer specific data. According to the techniques described herein, a set of datasets corresponding to an entity may be processed to generate a master dataset including rows that include at least a field name and a value corresponding to the field. The master dataset is processed to generate a corpus of text strings that is input into a word embedding function which generates a set of vectors based on the corpus. Because the configuration of the text string positions values by field names and field values, implicit relationships and contexts are identified within the data using the word embedding function.

16 Claims, 11 Drawing Sheets

(56) References Cited

U.S. PATENT DOCUMENTS

| | | | | |
|---|---|---|---|---|
| 8,738,632 B2* | 5/2014 | Bestgen | ............. | G06F 16/2237 |
| | | | | 707/744 |
| 8,874,552 B2* | 10/2014 | Jehuda | ................ | G06F 16/367 |
| | | | | 707/769 |
| 9,411,803 B2* | 8/2016 | Assulin | ................ | G06F 16/243 |
| 9,846,901 B2* | 12/2017 | Boston | ............... | G06Q 30/0627 |
| 2004/0117739 A1* | 6/2004 | Challenger | ............. | G06F 16/84 |
| | | | | 715/251 |
| 2011/0082855 A1* | 4/2011 | Al-Omari | .......... | G06F 16/2246 |
| | | | | 707/715 |
| 2012/0218254 A1* | 8/2012 | Abeln | ................ | G06T 11/206 |
| | | | | 345/419 |
| 2017/0083547 A1* | 3/2017 | Tonkin | ................... | G06F 16/23 |

\* cited by examiner

US 11,675,764 B2

LEARNED DATA ONTOLOGY USING WORD EMBEDDINGS FROM MULTIPLE DATASETS

FIELD OF TECHNOLOGY

The present disclosure relates generally to database systems and data processing, and more specifically to learned data ontology using word embeddings from multiple datasets.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Database systems may support searches using natural language queries. To support such queries, possible natural language queries may be mapped to database queries. A database administrator or user may maintain a mapping of various grammatical forms of natural language queries to database queries. However, the mapped database queries may be processed on datasets with data that is not structured or contextual, meaning that the datasets are generic and may not reflect relationships between data that may occur within datasets that are unique to the owner of the dataset. Thus, the query results may be inaccurate, non-contextual, or ineffective to the user who submitted the query.

DETAILED DESCRIPTION

Figure 1:
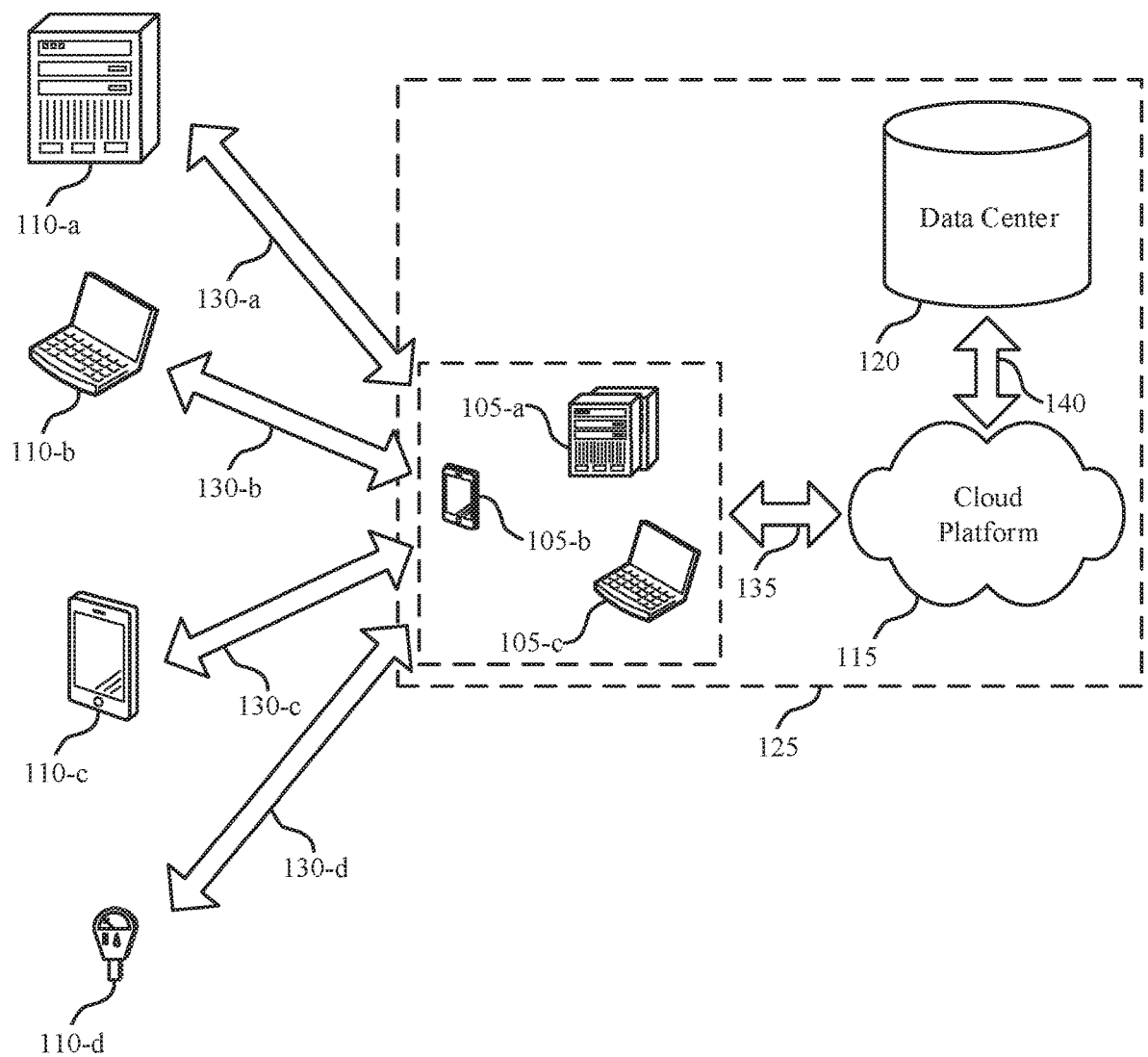
FIG. 1 illustrates an example of a system for data processing that supports learned data ontology using word embeddings from multiple datasets in accordance with aspects of the present disclosure.

Database systems may support searches using natural language queries. To support such queries, possible natural language queries may be mapped to database queries. A database administrator or user may maintain a mapping of various grammatical forms of natural language queries to database queries. However, the mapped database queries may be processed on datasets with data that is not structured or contextual, meaning that the datasets are generic and may not reflect relationships between data that may occur within datasets that are unique to the owner of the dataset. Thus, the query results may be inaccurate, non-contextual, or ineffective to the user who submitted the query.

Techniques described herein may support a learned ontology or meaning for user, organization, or customer specific data. According to the techniques described herein, a set of datasets corresponding to an entity may be processed such that the system identifies relationships between otherwise unstructured data. A database system may process a set of datasets (e.g., customer-specific datasets) to generate a master dataset that is used to generate sets of text strings that are processed by a word embedding function to generate a vector set. Utilization of the word embedding function in this manner may result in a vector set that implicitly captures context between the data and concepts within the data such that queries against the data may result in more accurate and appropriate query results.

By generating the vector set on entity specific data, the system supports natural language queries without having to map possible natural language queries to database queries. When a query is received, a set of vectors may be generated by the word embedding function using the query as input. The one or more query vectors may be compared to the vector space to identify and surface results. In some examples, topic vectors or landmark vectors are generated for each entity specific vector space, and when a query vector is adequately close (e.g., similar) to one of the topic vectors, then an action, such as a visualization action, may be triggered (e.g., based on the type of data that is associated with the topic vector). For example, a user may enter a query such as, "top deals in Japan," which may result in a map of Japan being displayed based on the query including a geographic trigger (e.g., Japan) which may be close to a topic or landmark vector for a set of countries in the vector space. Other techniques are supported such as identification of a "better" query and implicit data lineage. Using these techniques, various concepts may be identified in queries. In an example query, "top car sales in Japan," two concepts may be identified. "Car" may be identified as an industry, and "Japan" may be identified as a country. These and other techniques are further described with respect to the figures.

Aspects of the disclosure are initially described in the context of an environment supporting an on-demand database service. Aspects of the disclosure are further described with respect to a general system diagram that shows computing components and data flows that support learned data ontology, a diagram illustrating dataset conversion for word embedding processing, a vector space diagram illustrating an example result of the word embedding process described herein, and a process flow diagram illustrating various process and dataflows that support the techniques herein. Aspects of the disclosure are further illustrated by and described with reference to apparatus diagrams, system diagrams, and flowcharts that relate to learned data ontology using word embeddings from multiple datasets.

FIG. 1 illustrates an example of a system 100 for cloud computing that supports learned data ontology using word embeddings from multiple datasets in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (132B) Interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system.

In this case, cloud platform 115 may serve multiple cloud clients 105 with a single instance of software. However, other types of systems may be implemented, including but not limited to client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be example of a multi-tenant system that supports data storage, retrieval, data analytics, and the like for various tenants, such as the cloud clients 105. As such, each cloud client 105 may be provided with a database instance in the data center 120, and each database instance may store various datasets that are associated with the particular cloud client 105. More particularly, each cloud client 105 may have a specific set of datasets that are unique for the cloud client 105. The cloud platform and data center 120 support a system that processes a set of datasets for a particular cloud client 105 and generates a vector set based on the set of datasets that may be used for processing natural language queries. As such, the vector set supports customer specific analytics by capturing contexts or meanings that are unique to the cloud client 105. Thus, each vector set is unique to a cloud client 105, but the technique described herein may be scaled to be applicable to a plurality of cloud clients without requiring specific configuration for each cloud client 105.

Some analytical data systems may utilize mapping techniques to map natural language queries to database queries. These techniques may require significant and manual configuration and upkeep. Further, these mapping techniques may not be unique for a specific entity's data, and as such, the queries may result in ineffective query results. Additionally, the various datasets may be unique for specific entities, but a database table may not capture the various context and concepts that are implicit in the data due to the unique data for an entity. Thus, analytical systems that use generic database queries on datasets that do not capture implied meaning are not able to identify specific insights within the data and do not support unique actions that may be triggered as a result of a query.

As described herein, the data center 120 and cloud platform 115 may support processing of entity specific datasets to generate a vector set that is able to capture implied meanings, ontologies, and relationships between data. Further, the vector sets support identification of context within natural language queries such that the queries result in more meaningful results. To generate the vector set, the system generates a master dataset based on the set of datasets that correspond to a particular entity. Based on the master dataset, the system generates a set of strings for each row of the master dataset (or a subset of the rows of the master dataset). The set of strings for a particular row are configured in a manner such that relationships between column names (e.g., field names), dataset names (e.g., table names) and the respective values are captured in a vector generated by a word embedding function that receives the set of strings as inputs, which results in a vector space that reflects the implicit relationships in all of the data of the plurality of datasets for an entity. Further, topic or landmark vectors may be identified in the vector space, and when a particular topic is identified in a query, the system may activate an action based on the topic.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

A cloud client 105 may be an example of a company that sells widgets around the world. The company maintains a dataset (e.g., table) named opportunities that lists opportunities for selling different versions of the widget and priorities associated with the particular opportunities. Further, the company may also maintain a table listing details about the product. The system described herein may process the two datasets a vector space for the data of both datasets. The word embedding function used to process the datasets may implicitly identify relationships between the various data, such that when a user runs a query on the data, such as "top sales leads in Japan," the system may display a map of Japan with the sales opportunities identified by location.

Figure 2:
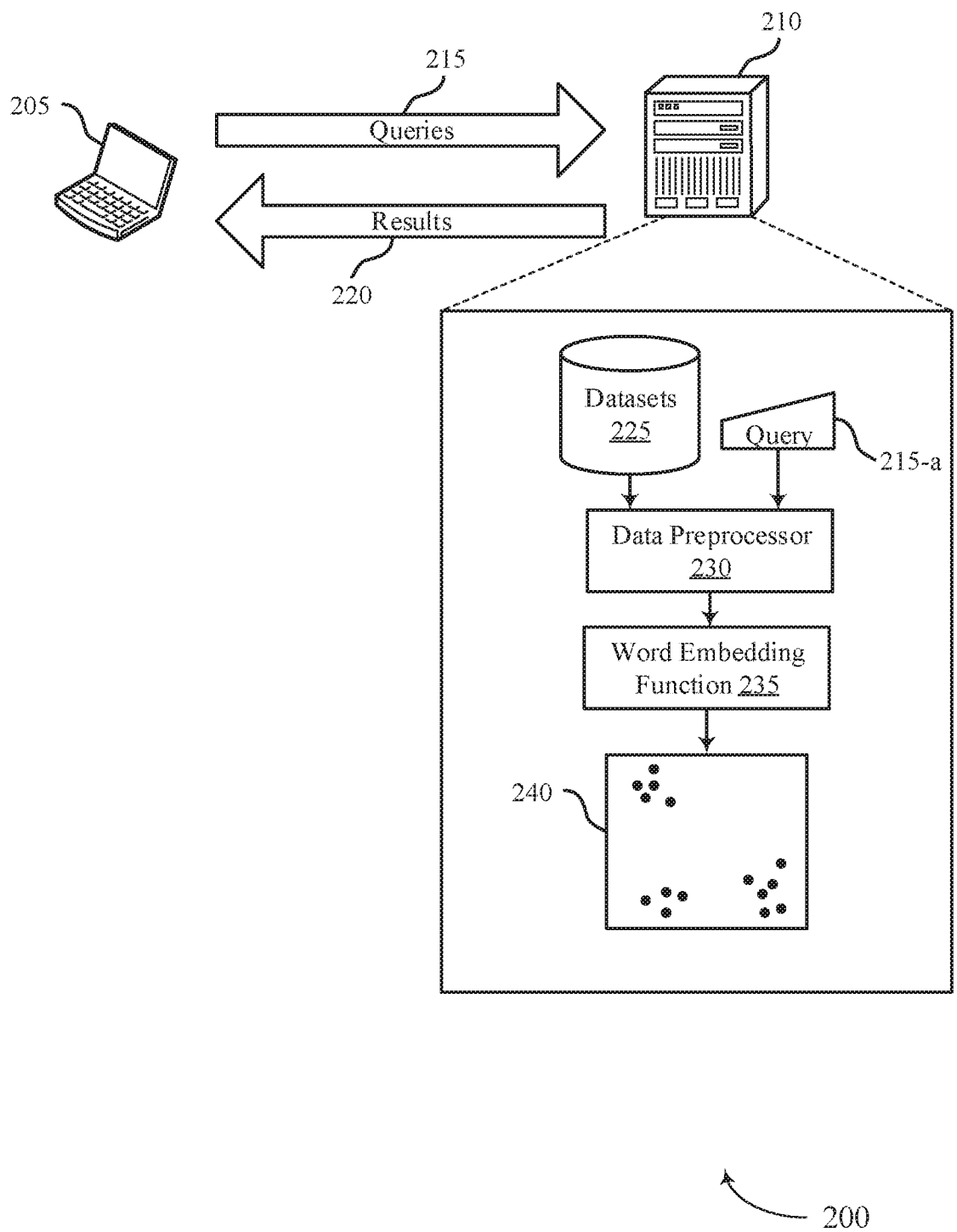
FIG. 2 illustrates an example of a computing system that supports learned data ontology using word embeddings from multiple datasets in accordance with aspects of the present disclosure.

FIG. 2 illustrates an example of a computing system 200 that supports learned data ontology using word embeddings from multiple datasets in accordance with aspects of the present disclosure. The computing system 200 includes a user device 205 and a server 210. The user device 205 may be an example of a device associated with a cloud client 105 or contact 110 of FIG. 1. The server 210 may be examples of aspects of the cloud platform 115 and the data center 120 of FIG. 1. For example, the server 210 may represent various devices and components that support an analytical data system as described herein. The server 210 may support a multi-tenant database system, which may manage various datasets 225 that are associated with specific tenants (e.g., cloud clients 105). The server 210 may also support data retrieval in response to queries 215 received from user devices, such as user device 205. The data retrieved in response to a query 215 may be surfaced to a user at the user device 205.

As described, the server 210 may manage various datasets 225 that are associated with specific tenants. For example, a datastore may store a set of datasets 225 that are associated with the tenant corresponding to user device 205. Each dataset of the set of datasets 225 may be or may correspond to a database table. To support learned data techniques described herein, a data preprocessor 230 may covert the set of datasets into a master dataset that includes data from each dataset 225. The master dataset may include master dataset rows that include a dataset name (e.g., corresponding to the original dataset), an indication of one or more fields of the dataset (e.g., a column name), and one or more values associated with the field that is identified from the respective dataset. In some examples, each row in the master dataset also includes an indication of a number of occurrences of the value within the respective dataset.

The data preprocessor 230 may use the master dataset to generate a set of text strings for input into a word embedding function 235. For example, at least one set of text strings may be generated for each row of the master dataset. A set of text strings may include a tokenized version of the dataset name, a tokenized version of the field, and a tokenized version of the value. The set of text strings may also include a field name string (e.g., non-tokenized) that is positioned between the tokenized version of the field and the tokenized version of the value. As is described in further detail with respect to FIG. 3, the configuration (e.g., ordering) of components within each set of text strings leverages the windowing process of the word embedding function 235 to identify implicit relationships between the dataset name, field name, fieldname string, and the values.

The word embedding function 235 may process each set of text strings to generate a vector set 240 for the tenant-specific data. The word embedding function 235 may be an example of a function that uses a neural network to identify word associations on a corpus of data. The preprocessing technique described herein at the data preprocessor 230 formats the set of text strings such that the word embedding function 235 identifies word associations between dataset fields and values. The word embedding function 235 may generate a vector of n-dimensions (e.g., hundreds of dimensions) for each set of text strings. In the resultant vector set 240, the vectors that are similar (e.g., cosine similarity between the vectors) represents semantic similarity between the words that are the basis for the respective vectors. For examples, vectors generated for a column called "shipping country" in a dataset would have a high cosine similarity in the vector set 240. In some examples, the word embedding function 235 represents an algorithm and models to produce word embeddings. In some examples, the word embedding function 235 represents software such as Word2vec, GloVe, or the like.

As the word embedding function 235 generates the vectors for each row of the master dataset, the word embedding function 235 is trained. As noted, the vector set 240 implicitly represents relationships or similarities between the data of the datasets 225. Thus, the word embedding function 235 and the vector set 240 may support valuable data analytics. For example, queries 215 received from the user device 205 may be converted to a set of query vectors, which may be compared to various vectors in the vector set 240 to identify similar or related query results, including concepts identified in the query. For example, vectors that satisfy some threshold similarity with the query vectors may be identified as query results. As such, the corresponding data from the master dataset or the original dataset 225 may be returned to the user. Further, these techniques may support additional analytic techniques, such as identification of topic vectors (e.g., unique to a tenant), association and triggering actions (e.g., data visualization actions) for topic vectors, suggested queries, and models for suggested visualizations. These concepts and techniques are further described with respect to the following figures.

Figure 3:
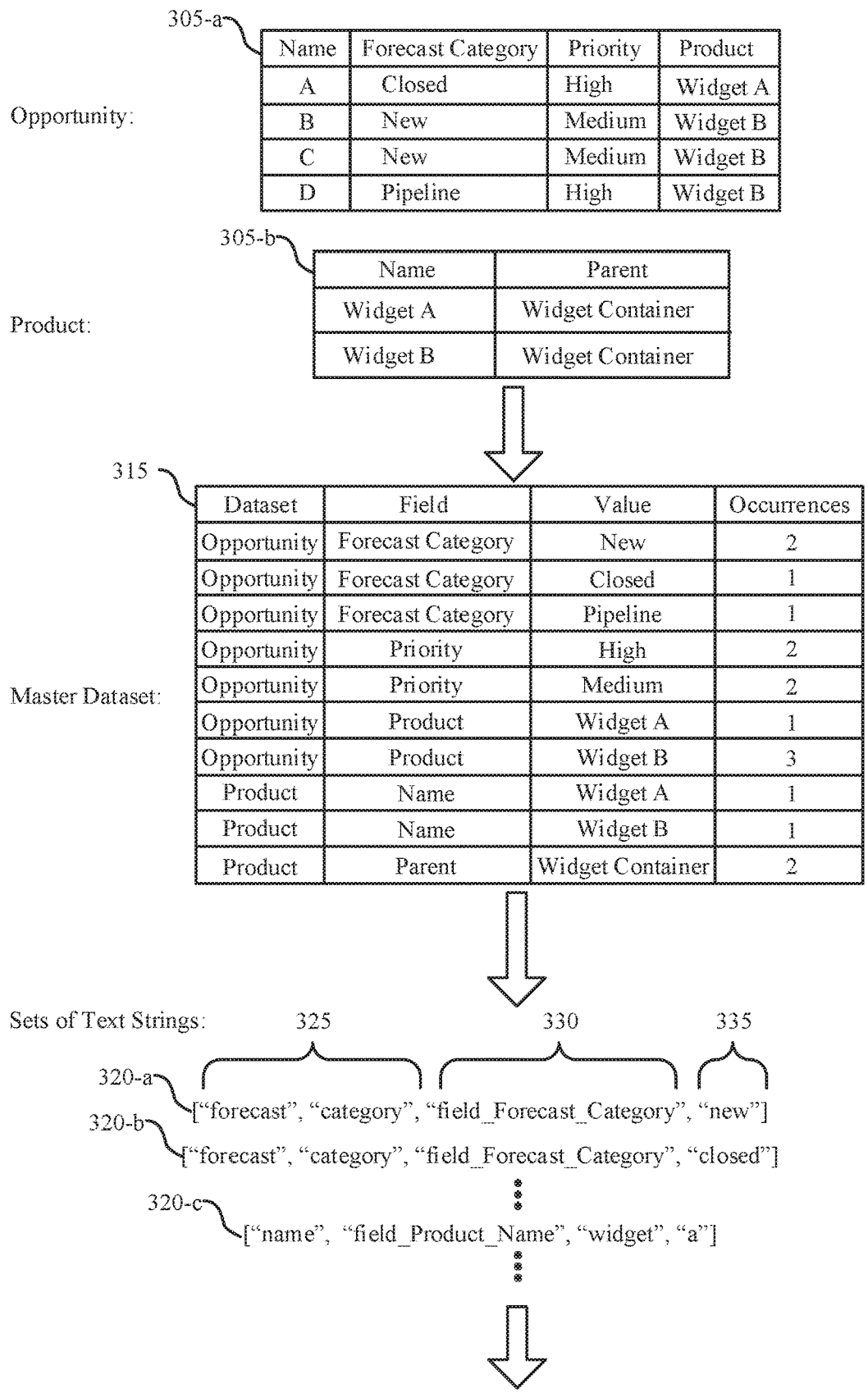
FIG. 3 illustrates an example of a dataset processing diagram that supports learned data ontology using word embeddings from multiple datasets in accordance with aspects of the present disclosure.

FIG. 3 illustrates an example of a dataset processing diagram 300 that supports learned data ontology using word embeddings from multiple datasets in accordance with aspects of the present disclosure. The dataset processing illustrated by dataset processing diagram 300 may be implemented by aspects of FIG. 2, such as the server 210, the cloud platform 115, and/or the data center 120. The dataset processing diagram 300 includes a dataset 305-a and dataset 305-b. The datasets 305 may be examples of datasets that correspond to a particular tenant (e.g., cloud client 105 of FIG. 1) of a multi-tenant database system. The datasets 305 may be examples of database tables. The process illustrated in FIG. 3 may be performed for each tenant or a subset of tenants of the multi-tenant database system. It should be understood that the techniques described may be implemented for a plurality of datasets that are associated with a particular tenant. That is, the techniques may be scalable for a number of datasets and across multiple tenants without or with very little tenant or dataset specific configuration.

The dataset 305-a is named "opportunity," and the dataset 305-h is named "product." Each dataset 305 has a set of columns, and the name of the column may be referred to as a field or field name. For example, dataset 305-a has a column/field named "Forecast Category." A preprocessing component, such as data preprocessor 230 of FIG. 2, may generate a master dataset 315 based on the datasets 305. This process may compress a large number of rows (e.g., billions of rows) across hundreds or thousands of datasets associated with an entity into a single dataset of "facts" (e.g., values) and their occurrences. As such, the process samples each dataset row to generate the master dataset 315. For example, the master dataset 315 includes a column (e.g., "Dataset") that corresponds to a name of the dataset front which the respective data is extracted or sampled. Further, the master dataset 315 includes a column (e.g., "Field") that lists the respective field names of the respective dataset from which the corresponding value is sampled. As such, the master dataset 315 includes a column, "value," that lists corresponding values and a column "occurrences" which lists the number of occurrences of the respective value in one or more of the datasets 305. Accordingly, each row of the master dataset 315 lists a dataset name, a field of a dataset 305, a value of the dataset 305, and the number of occurrences of the value. Thus, using this technique, a large number of datasets 305 may be compressed to a master dataset 315.

Each row of the master dataset 315 may be converted to a set of text strings 320 including one or more elements. The set of text strings 320 may be a single text that uses a field name, field label, and value. The field label (e.g., an indication of the field) may correspond to the field column of the master dataset and may be normalized and tokenized as text, such that various concepts may be captured. A field name (e.g., field name string) may correspond to a background or backend name of the respective field. This field name string is not tokenized since it may be a singular concept and so that it may be recovered during querying. The value may be normalized and tokenized. For example, set of text strings 320-a includes an element that is a tokenized version of the field 325 (e.g., field name), an element that is a non-tokenized version of the field name 330, and an element that is a tokenized version of the value 335. In some examples, a set of text strings 320 may additionally include a dataset name. The field name may be prefixed with the text "field," as illustrated in field name 330 in set of text strings 320-a. This field name may be used to join facts (e.g., value) with concepts. As such, the field name is positioned between the concepts (e.g., tokenized version of the field) and the facts (e.g., tokenized version of the value).

The technique of positioning the field name between concepts and facts leverages the "windowing" aspects of a word embedding function. That is, the window of a word embedding function may identify prior and subsequent words, and thus may link the facts and concepts via the field name. The word embedding function may generate a vector for each element in the set of text strings. For example, for a database that has a field label of "shipping countries," the process herein may be used to learn that "canada" is similar to "united states" and "mexico" and that these are all countries. The technique generates a corpus of data (e.g., many sets of text strings, that includes "country canada," "country united states," and "country mexico" repeated many times. Thus, the embeddings or vectors for these inputs may be similar due to the adjacencies of these words (e.g., as measured in vector space). Further, if the input datasets had multiple concepts of "country," such as fields within and across datasets such as "billing country," "shipping country," and "country of origin," the resultant vectors may be similar since the fields are similar (e.g., all include "country"). As another example, the following may be examples of text strings that are generated based on a master dataset comprising data of multiple datasets:

["shipping", "field_SHPPNG_CNTRY_TOP8_NM", "united", "states"]
["shipping", "country", "field_SHPPNG_ENTRY_TOP8_NM", "canada"]
["country", "area", "field_CNTRY_AREA_SUB_US_LKP_NM", "canada"]
["country", "area", "field_CNTRY_AREA_SUB_US_LK_NM" "france"]
["red", "account", "subregion" "field_Red_Account_c.CSG_Subregion_c" "united", "states"]
["red", "account", "subregion", "field_Red_Account_c.CSG_Subregion_c", "canada"]

With enough of these types of inputs, an analysis of the word embeddings may reveal that "united states," "canada," and "france" are all countries and the esoterically named fields "SHPPNG_CNTRY_TOP8_NM", "CNTRY_AREA_SUB_US_LKP_NM", and "Red_Account_c.CSG_Subregion_c" are related and contain facts about countries. The following are more examples of the text strings that may be generated:

["global", "company", "name", "field_GLOBAL_CO_NM", "bmw"]
["global", "company", "name", "field_GLOBAL_CO_NM", "pwc"]
["company", "name", "field_Comp.Name", "bmw"]
["company", "name", "field_Comp.Name", "comcast"]
["opportunity", "name", "field_Opp.Name", "bmw"]
["opportunity", "name", "field_Opp.Name", "daimler", "ag"]

These samples support learning of concepts that may be more difficult to generalize into a global ontology for an entity such as for "opportunities." These examples may teach the encoding that "bmw," "pwc." "comcast," and "daimler ag" are all companies and opportunities. The corpus or plurality of sets of text strings may also apply phrasing to build combined tokens for inputs such as "united states" and "red account." Further, rows may be duplicated based on the number of occurrences. For example, if two occurrences of a particular value occur in a dataset 305 as reflected in the master dataset 315, the process may generate two sets of text strings. In some examples, the increase or duplication is not 1:1, but logarithmic, or some other sampling frequency that weights the number of text strings according to their occurrences in the datasets 305. These techniques may be used irrespective to the language used.

Figure 4:
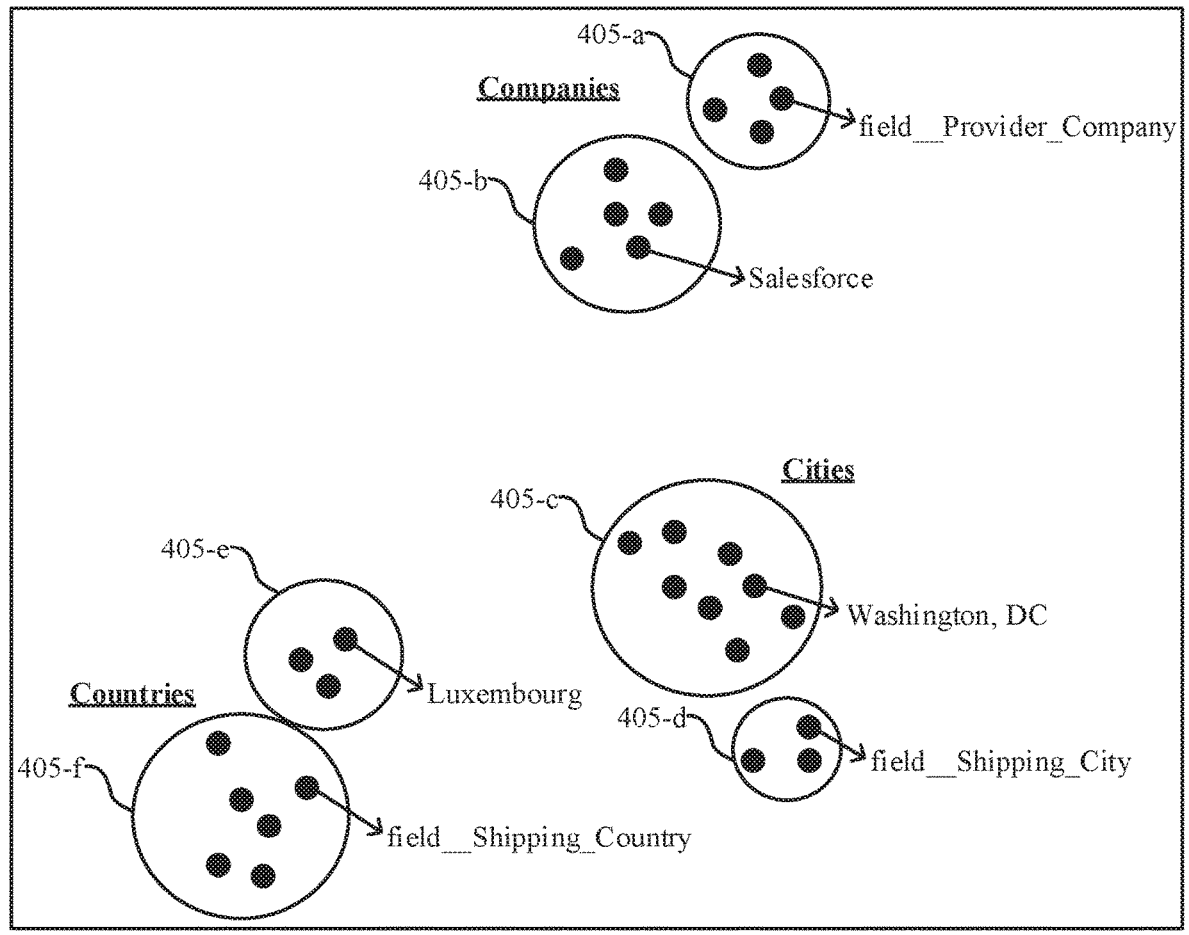
FIG. 4 illustrates an example of a vector space projection that supports learned data ontology using word embeddings from multiple datasets in accordance with aspects of the present disclosure.

After implementing these techniques, the corpus may be able to identify similarities of the field names, cities, companies, accounts, etc. The techniques may also support learning of custom ontologies such as pod (e.g., groups of workers) names within an organization. For example, an input of a pod name of "gso" may return "na44, na32, na3, na66." These are just example ontologies that may be learned using these techniques, and other types of ontologies are expected to be identified using these techniques, FIG. 4 illustrates an example of a vector space projection 400 that supports learned data ontology using word embeddings from multiple datasets in accordance with aspects of the present disclosure. The vector space projection 400 is an example of a vector projection of multi-dimensional vectors generated using the techniques described herein into a two-dimensional vector space. Various examples of the text inputs that are the basis of the vectors are illustrated. The vector space includes various clusters 405 of vectors.

As illustrated, the clusters 405 may form in areas related to concepts. For example, clusters 405-a and 405-b are clusters related to companies, clusters 405-c and 405-d are clusters related to cities, and clusters 405-e and 405-f are clusters related to countries. Further, according to the techniques, the field names related to the concepts cluster in similar areas as the facts. For example, the cluster 405-a may include a set of field names that relate to companies (e.g., field_Provider_Company) that is in a similar area of the cluster 405-b of vectors representing company names.

As described herein, these techniques support various analytic applications. In one example application, a landmark or topic vector may be generated for a concept, such as countries, cities, or stages in a sales pipeline. Rather than using an exhaustive dictionary of terms that corresponds to a concept, a single value may be used which may be defined or provided. Given that a learned embedding for each tenant or customer may be different, standardized landmarks, such as Canada, or known field names may be used as a vector to represent the concept. Thus, using vector similarity calculations techniques, the landmark vector may be used to identify other vectors that relate to the concept. Further, an action, such as a data visualization action may be associated with a landmark vector. Accordingly, when a query results in a vector that is similar to the topic/landmark vector, the action may be triggered. For example, when a user enters a query such as "top car sales in Japan," a query vector for "Japan" may be identified as sufficiently similar (e.g., within some threshold similarity) to the country vector, and "car" may be identified as sufficiently similar to an industry vector As a result, a data visualization action for triggering display of a country (taking Japan as input) may be activated. Other data visualization actions may include deal stage (e.g., sales pipeline stage) that trigger the use of a funnel visualization, a yes/no survey response may activate a pie chart visualization, etc.

Thus, given a specific query, the system may support recommendation of a visualization. Without using these word embedding techniques, a sparse model may need to be trained that is hard to generalize. Thus, by implementing an understanding of concepts or similarities between fields, including fields across different datasets, generation of a set of specific observations may be avoided. For example, without the techniques described herein, a set of dataset specific observations may be generated such as:
Opportunities, BillingCountry, BillingState,→Map
Users, HomeCountry, HomeState,→Map These observations may mean that queries related to the listed fields may trigger a map. These examples may be easy to understand for a human, but a machine learning model may not be able to generalize these mapping triggers, as the encoding for Billing Country, HomeCountry, and HomeState would likely be arbitrary and unrelated. Further, the model may be certain that these fields, if from different datasets, with the same name are the same concept. However, using the embedding techniques described herein, the concepts may be generalized based on the similarities learned through the underlying data of these fields. That is, similar concepts, such as countries in BillingCountry and HomeCountry may have similar vector representations. Thus, BillingCountry could be represented by a vector [1.01, 2.41] and HomeCountry by a similar vector [1.02, 2.40]. As such, the training set for triggering these actions and visualizations may become less sparse.

The techniques may also support implicit data lineage as an analytical application. A new dataset may be analyzed to determine whether data of the new dataset corresponds to data within one or more of the existing datasets. For example, a data lineage process may generate a vector for each value of a column of the new dataset and determine an average vector for the column. The average vector may support identification of existing similar values in the vector space projection 400. By identifying the similar values, known fields/columns in the existing datasets may be identified such as to relate the data of the new dataset to the existing datasets. That is, by identifying corresponding fields, implicit data lineage from a new disconnected dataset may be identified for existing data with known lineage. As such, with the new dataset connected via implicit data lineage, natural language query models may be used, and sematic search may be used for the data with proper lineage. In some examples, the new dataset may be an external dataset that is updated or connected using external connectors.

These techniques may also support query recommendation or identification. For example, a relationship between fields of a dataset or different datasets may be identified. A vector for the first field may be identified in the vector space projection 400, and a vector for the second field may be identified in the vector space projection 400. When a query vector generated for a received query is identified as being similar to the first field, then the system may generate a query response to the query using values associated with the second field based at least in part on the relationship between the first field and the second field. In some cases, this may include identifying a database query to use in conjunction with the received query to identify additional results.

As noted elsewhere herein, the described process may identify implicit concepts present in the data associated with a tenant, entity, or organization. Since the data is associated with a particular tenant, and because such datasets are structured to capture various aspects of an entity, the data may theoretically include a limited number of concepts that are identifiable. The techniques described herein provides a processing efficient manner to identify these implicit concepts. More particularly, the text strings are generated such that the fields and values are positioned "near" each other to leverage the windowing functionality of the word embedding function. The word embedding function generates the vectors for a particular element using nearby elements or texts, and as such, the vectors described herein are based on, not only the particular element, but the elements that were purposefully positioned nearby, which results in vectors that capture the context of the elements. Thus, processing inefficient machine learning models may not have to be run on hundreds or thousands of datasets. Rather, the datasets are efficiently sampled to produce the corpus of text strings, which are processed by the word embedding function.

Figure 5:
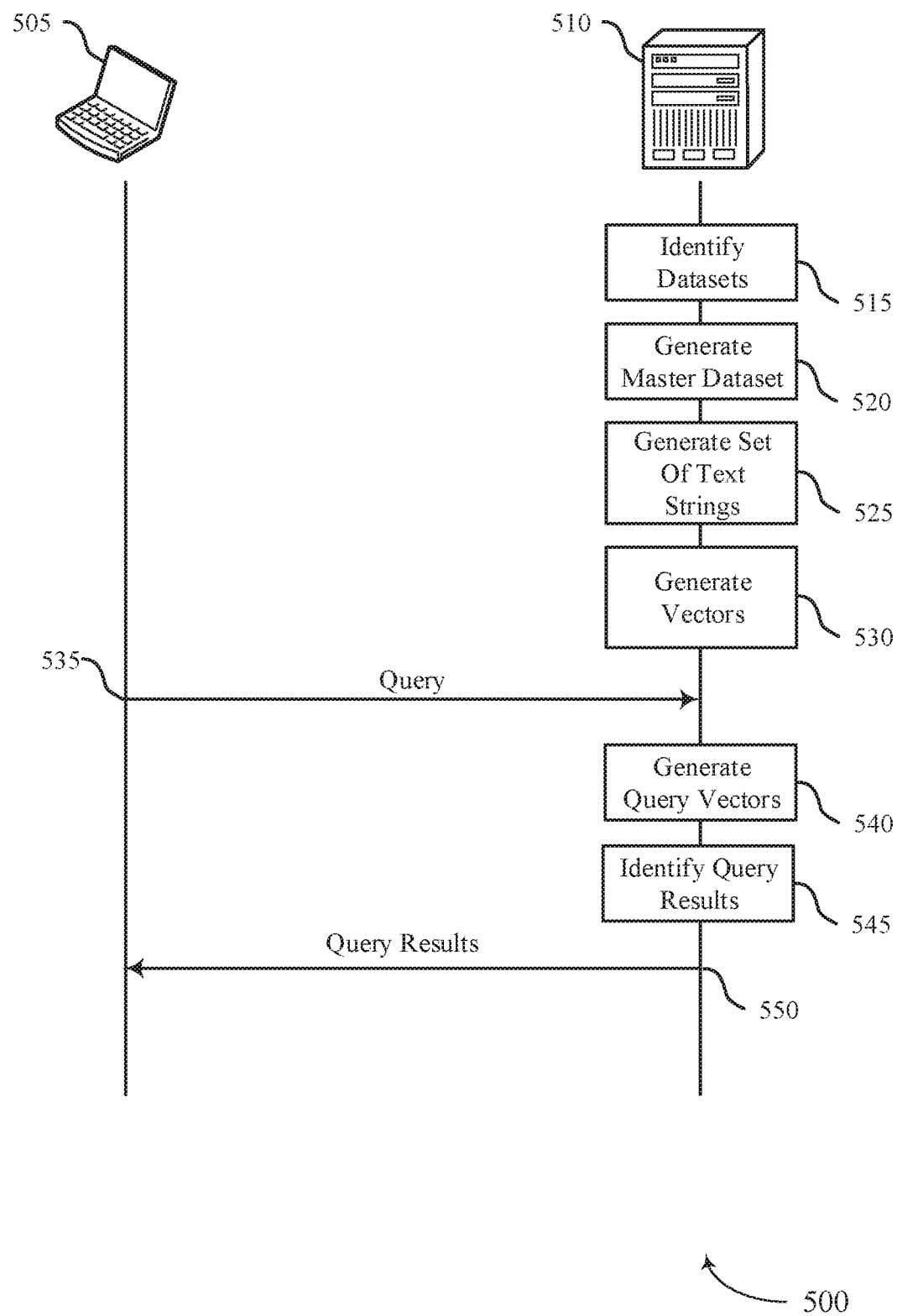
FIG. 5 illustrates an example of a process flow diagram that supports learned data ontology using word embeddings from multiple datasets in accordance with aspects of the present disclosure.

FIG. 5 illustrates an example of a process flow diagram 500 that supports learned data ontology using word embeddings from multiple datasets in accordance with aspects of the present disclosure. The process flow diagram 500 includes a user device 505 and a server 510. The user device 505 may be an example of the user device 205 as described with respect to FIG. 2, and the server 510 may be an example of the server 510 as described with respect to FIG. 2. The server may represent a set of computing components, data storage components, and the like, that support a multi-tenant database system as described herein. The process illustrated in FIG. 5 may be performed for various tenants of the multiple tenant system.

At 515, the server 510 may identify a plurality of datasets for conversion into a set of vectors. Each dataset of the plurality of datasets may be associated with a dataset name and include a plurality of rows. Each value of a row is associated with a respective field (e.g., a column). The server 510 may identify the plurality of datasets based on an indication by a user, based on the datasets being associated with a specific tenant, or a combination thereof.

At 520, the server 510 may generate a master dataset based on the plurality of datasets. The master dataset may include a plurality of master dataset rows, and each master dataset row may include the dataset name associated with a dataset, an indication of a field from the dataset, and a value associated with the field identified from the dataset associated with the dataset name. In some cases, the master dataset includes an indication of the number of occurrences of a value in a particular dataset.

At 525, the server 510 may generate a set of text strings for each master row of the master dataset, where each set of text strings includes a tokenized version of the field and a tokenized version of the value. In some cases, the server 510 generates additional sets of text string for a row based on the number of occurrences.

At 530, the server 510 may generate a vector corresponding to each element of each generated set of text strings using a word embedding function to form the set of vectors. As the word embedding function may use a windowing technique to ascertain relationships between words that may be positioned near each other in a text corpus, the configuration of the set of text strings may support identification of relationships between words in the datasets. As such, vectors that are related based on concepts (e.g., facts or fields) may have similar vectors (e.g., cosign similarity).

At 535, the user device 505 transmits a query to the server 510. The query may be an example of a natural language query, such as "best opportunities in France." At 540, the server 510 may generate, using the word embedding function, at least one query vector corresponding to a received query. At 545, the server 510 may identifying one or more query results based at least in part on a similarity between the at least one query vector and one or more vectors of the set of vectors.

At 550, the server 510 may transmit an indication of the query results to the user device 505. In some cases, the similarity may be between one of the query vectors and a landmark vector, which may trigger an action, such as a data visualization action. As such, the results may be a display of a map that shows pins corresponding to the opportunities in Japan, for example. Other data visualization actions are contemplated within the scope of the disclosure, including chart displays, pipeline displays, etc. In other cases, one of the query vectors may be similar to a vector that is identified as being related to another vector. As such, the query results may be identified using a modified query based on the related other vector.

Figure 6:
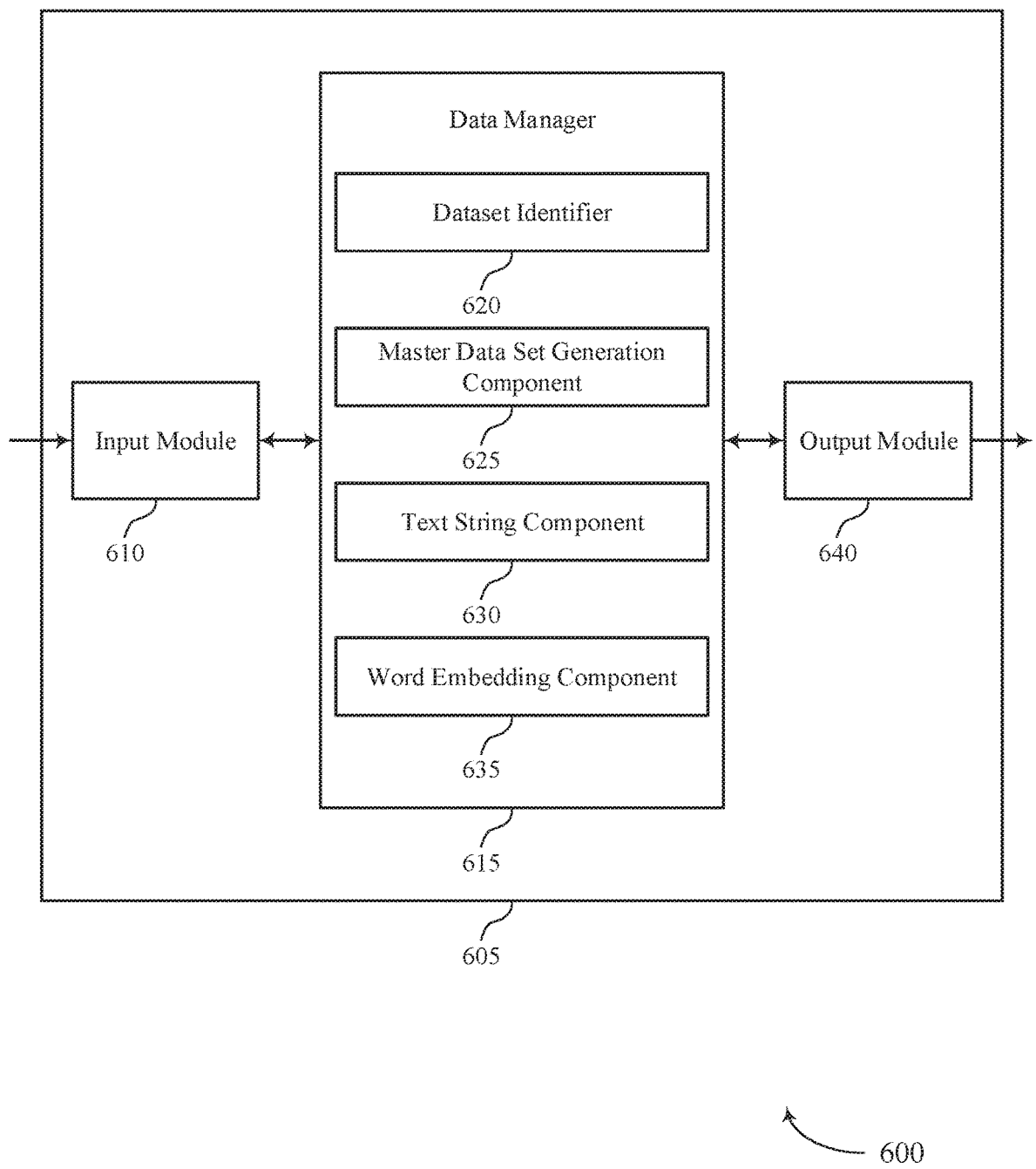
FIG. 6 shows a block diagram of an apparatus that supports learned data ontology using word embeddings from multiple datasets in accordance with aspects of the present disclosure.

FIG. 6 shows a block diagram 600 of an apparatus 605 that supports learned data ontology using word embeddings from multiple datasets in accordance with aspects of the present disclosure. The apparatus 605 may include an input module 610, a data manager 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data manager 615 to support learned data ontology using word embeddings from multiple datasets. In some cases, the input module 610 may be a component of an input/output (I/O) controller 815 as described with reference to FIG. 8.

The data manager 615 may include a dataset identifier 620, a master dataset generation component 625, a text string component 630, and a word embedding component 635. The data manager 615 may be an example of aspects of the data manager 705 or 810 described with reference to FIGS. 7 and 8.

The data manager 615 and/or at least some of its various sub-components may be implemented in hardware, software executed by a processor, firmware, or any combination thereof. If implemented in software executed by a processor, the functions of the data manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data manager 615 and/or at least some of its various sub-components may be physically located at various positions, including being distributed such that portions of functions are implemented at different physical locations by one or more physical devices. In some examples, the data manager 615 and/or at least some of its various sub-components may be a separate and distinct component in accordance with various aspects of the present disclosure. In other examples, the data manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The dataset identifier 620 may identify a set of datasets for conversion into a set of vectors, each dataset of the set of datasets associated with a dataset name and including a set of rows, each value of a row associated with a respective field.

The master dataset generation component 625 may generate a master dataset based on the set of datasets, the master dataset including a set of master dataset of rows, each master dataset row including the dataset name associated with a dataset, an indication of a field from the dataset, and a value associated with the field identified from the dataset associated with the dataset name.

The text string component 630 may generate a set of text strings for each master row of the master dataset, each set of text strings including a tokenized version of the field and a tokenized version of the value.

The word embedding component 635 may generate a vector corresponding to each element of each generated set of text strings using a word embedding function to form the set of vectors.

The output module 640 may manage output signals for the apparatus 605. For example, the output module 640 may receive signals from other components of the apparatus 605, such as the data manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
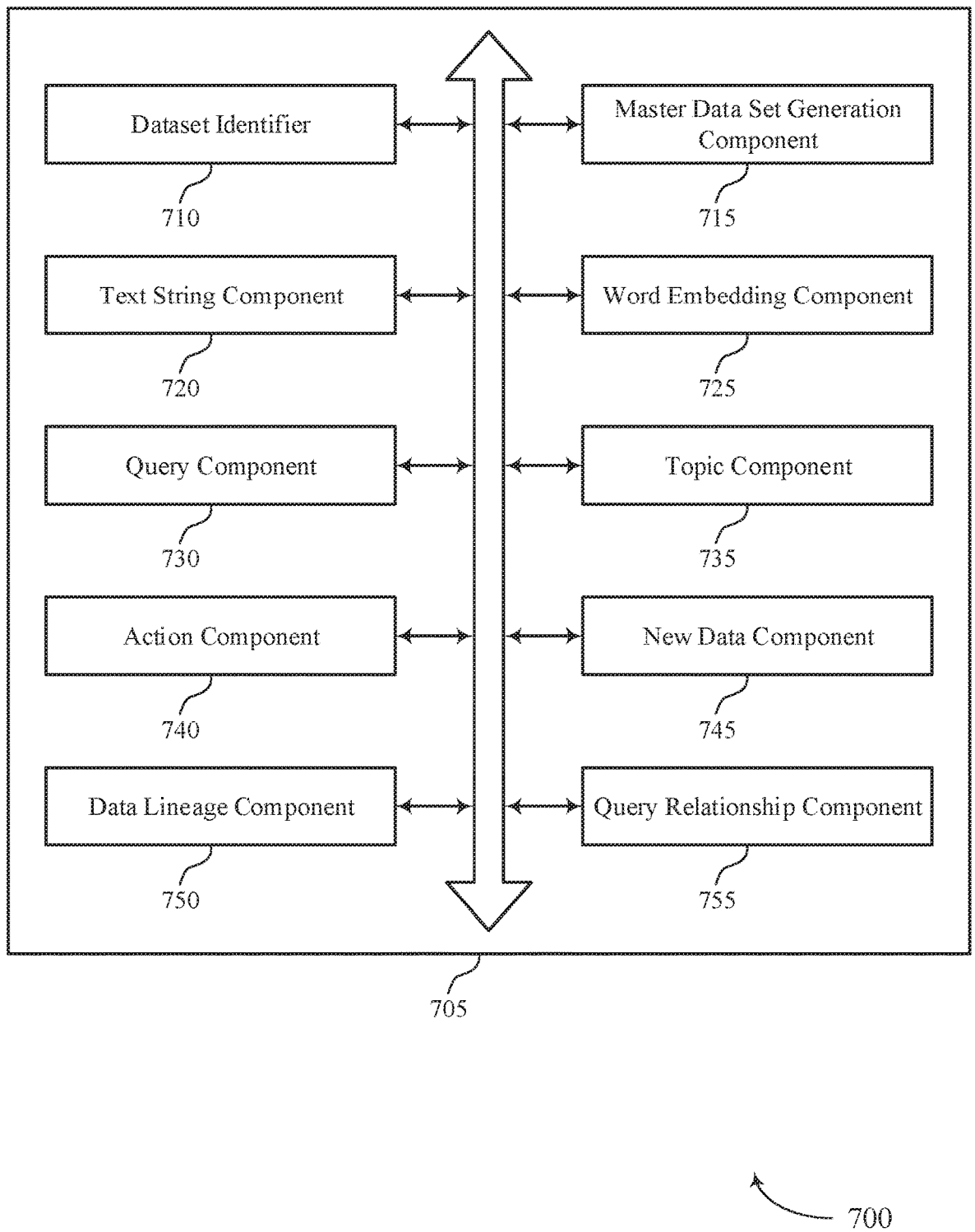
FIG. 7 shows a block diagram of a data manager that supports learned data ontology using word embeddings from multiple datasets in accordance with aspects of the present disclosure.

FIG. 7 shows a block diagram 700 of a data manager 705 that supports teamed data ontology using word embeddings from multiple datasets in accordance with aspects of the present disclosure. The data manager 705 may be an example of aspects of a data manager 615 or a data manager 810 described herein. The data manager 705 may include a dataset identifier 710, a master dataset generation component 715, a text string component 720, a word embedding component 725, a query component 730, a topic component 735, an action component 740, a new data component 745, a data lineage component 750, and a query relationship component 755. Each of these modules may communicate, directly or indirectly, with one another (e.g., via one or more buses).

The dataset identifier 710 may identify a set of datasets for conversion into a set of vectors, each dataset of the set of datasets associated with a dataset name and including a set of rows, each value of a row associated with a respective field.

In some examples, the dataset identifier 710 may identify the set of datasets that are associated with a first tenant of a multi-tenant database systems that supports a set of tenants, where a separate set of vectors is generated for each of one or more second tenants of the multi-tenant database system.

The master dataset generation component 715 may generate a master dataset based on the set of datasets, the master dataset including a set of master dataset of rows, each master dataset row including the dataset name associated with a dataset, an indication of a field from the dataset, and a value associated with the field identified from the dataset associated with the dataset name.

In some examples, the master dataset generation component 715 may include, within each master dataset row of the master dataset, an indication of a number of occurrences of the value in a respective dataset of the set of datasets.

The text string component 720 may generate a set of text strings for each master row of the master dataset, each set of text strings including a tokenized version of the field and a tokenized version of the value.

In some examples, the text string component 720 may generate one or more copies of text string of the set of text strings based on the number of occurrences of the value.

In some examples, the text string component 720 may generate a field name string for each set of text strings, where the field name string is positioned between the tokenized version of the field and the tokenized version of the value within the set of text strings.

The word embedding component 725 may generate a vector corresponding to each element of each generated set of text strings using a word embedding function to form the set of vectors.

The query component 730 may generate, using the word embedding function, a query vector corresponding to a received query. In some examples, the query component 730 may identify one or more query results based on a similarity between the query vector and one or more vectors of the set of vectors.

In some examples, the query component 730 may determine that a query vector corresponding to a received query satisfies a threshold similarity associated with the topic vector. The topic component 735 may identify a topic vector corresponding to a topic in the set of vectors.

In some examples, the topic component 735 may generate an input vector for each input of a set of inputs that correspond to the topic.

In some examples, the topic component 735 may identify the topic vector based on similarities between each input vector corresponding to the set of inputs.

In some examples, the topic component 735 may generate the topic vector using a field from one of the set of datasets. The action component 740 may associate an action with the topic vector corresponding to the topic vector.

In some examples, the action component 740 may activate the action associated with the topic vector based on determining that the query vector satisfies the threshold similarity.

In some examples, the action component 740 may associate a map visualization action with the topic vector that corresponds to a set of geographic locations, where the map visualization action triggers generation of a map when activated in response to a query vector satisfying a threshold similarity with the topic vector.

In some examples, the action component 740 may associate a sales pipeline visualization action with the topic vector that corresponds to a set of sales stages, where the sales pipeline visualization action triggers generation of a sales pipeline visualization when activated in response to a query vector satisfying a threshold similarity with the topic vector.

In some examples, the action component 740 may identify the topic vector based on the set of datasets being associated with a first tenant of a multi-tenant database system that supports a set of tenants. In some cases, the action corresponds to a data visualization action. The new data component 745 may receive a new dataset including one or more columns.

The data lineage component 750 may generate, for a column of the one or more columns and using the word embedding function, a set of value vectors that includes a value vector for each value in the column.

In some examples, the data lineage component 750 may calculate an average vector using each value vector of the set of value vectors.

In some examples, the data lineage component 750 may identify a relationship between the column and one or more columns of the set of datasets by identifying similarities between the average vector and one or more vectors of the set of vectors.

The query relationship component 755 may receive an indication of a relationship between a first field and a second field of the set of datasets.

In some examples, the query relationship component 755 may receive a query that is associated the first field based on a similarity between a query vector for the query and a vector that corresponds to the first field.

In some examples, the query relationship component 755 may generate a query response to the query using one or more values that are associated with the second field based on the relationship between the first field and the second field.

Figure 8:
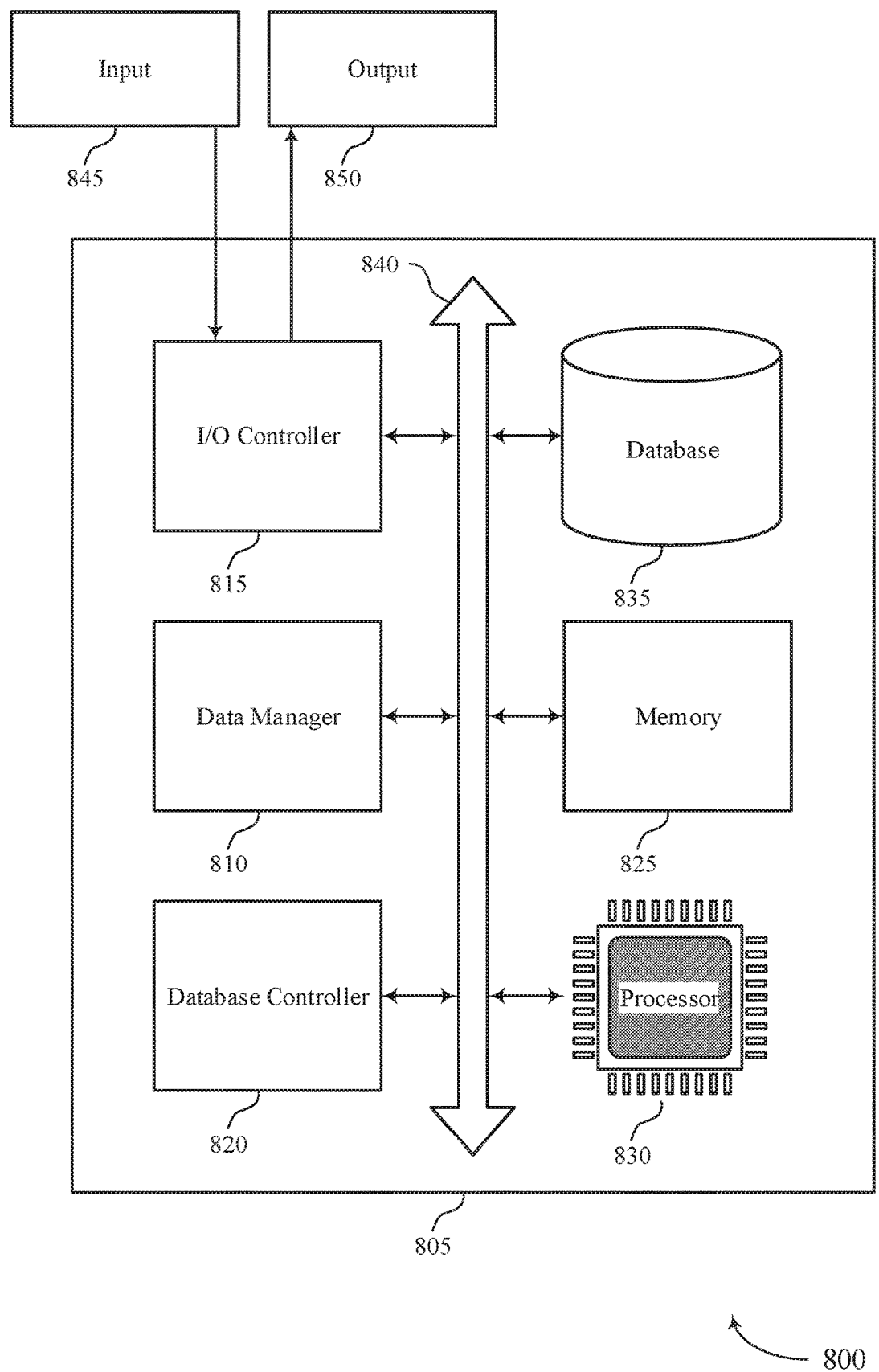
FIG. 8 shows a diagram of a system including a device that supports learned data ontology using word embeddings from multiple datasets in accordance with aspects of the present disclosure.

FIG. 8 shows a diagram of a system 800 including a device 805 that supports learned data ontology using word embeddings from multiple datasets in accordance with aspects of the present disclosure. The device 805 may be an example of or include the components of an analytical data store or an apparatus 605 as described herein. The device 805 may include components for bi-directional data communications including components for transmitting and receiving communications, including a data manager 810, an I/O controller 815, a database controller 820, memory 825, a processor 830, and a database 835. These components may be in electronic communication via one or more buses (e.g., bus 840).

The data manager 810 may be an example of a data manager 615 or 705 as described herein. For example, the data manager 810 may perform any of the methods or processes described herein with reference to FIGS. 6 and 7. In some cases, the data manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an AIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting learned data ontology using word embeddings from multiple datasets).

Figure 9:
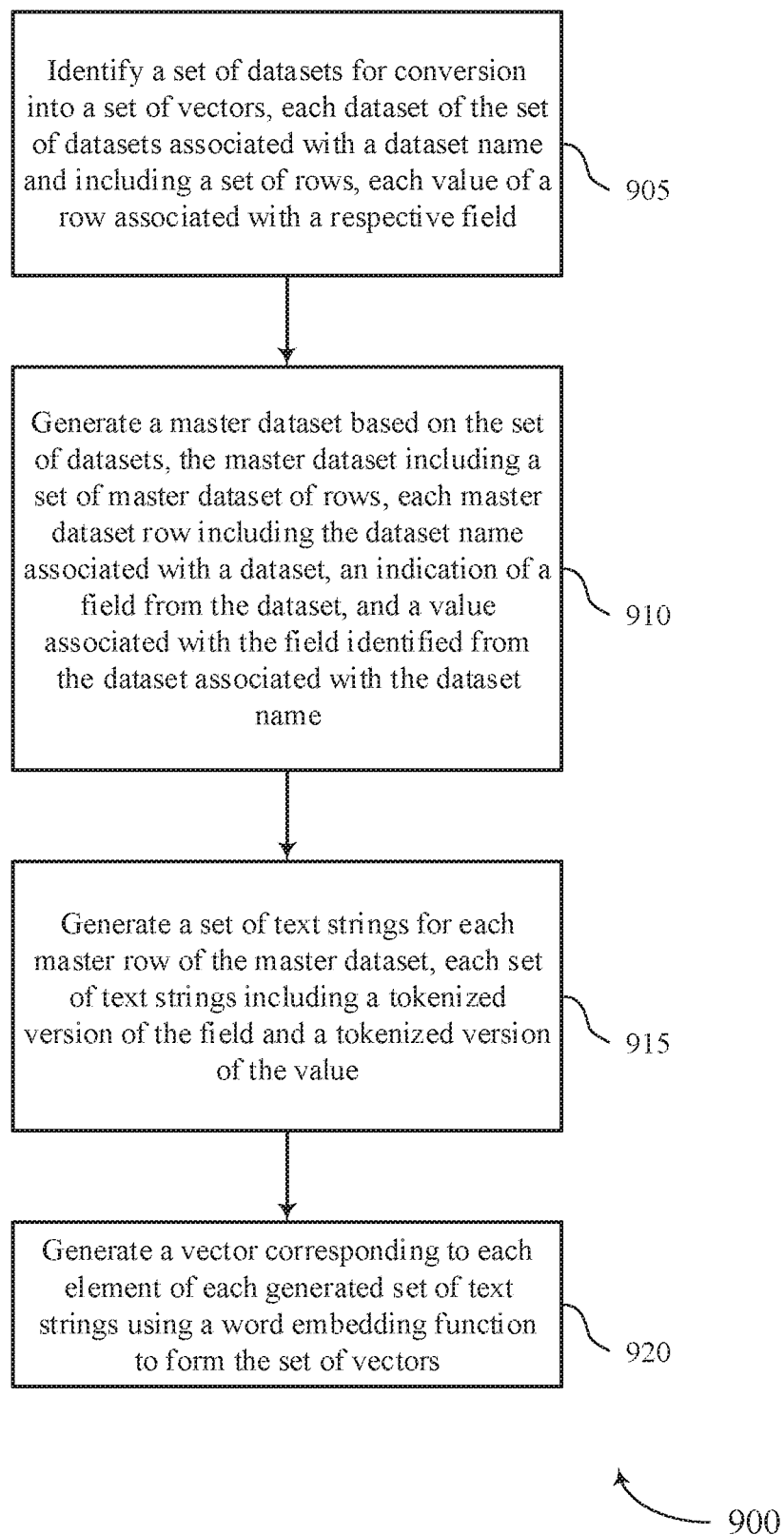
FIGS. 9 through 11 show flowcharts illustrating methods that support learned data ontology using word embeddings from multiple datasets in accordance with aspects of the present disclosure.

FIG. 9 shows a flowchart illustrating a method 900 that supports learned data ontology using word embeddings from multiple datasets in accordance with aspects of the present disclosure. The operations of method 900 may be implemented by an analytical data store or its components as described herein. For example, the operations of method 900 may be performed by a data manager as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 905, the analytical data store may identify a set of datasets for conversion into a set of vectors, each dataset of the set of datasets associated with a dataset name and including a set of rows, each value of a row associated with a respective field. The operations of 905 may be performed according to the methods described herein. In some examples, aspects of the operations of 905 may be performed by a dataset identifier as described with reference to FIGS. 6 through 8.

At 910, the analytical data store may generate a master dataset based on the set of datasets, the master dataset including a set of master dataset of rows, each master dataset row including the dataset name associated with a dataset, an indication of a field from the dataset, and a value associated with the field identified from the dataset associated with the dataset name. The operations of 910 may be performed according to the methods described herein. In some examples, aspects of the operations of 910 may be performed by a master dataset generation component as described with reference to FIGS. 6 through 8.

At 915, the analytical data store may generate a set of text strings for each master row of the master dataset, each set of text strings including a tokenized version of the field and a tokenized version of the value. The operations of 915 may be performed according to the methods described herein. In some examples, aspects of the operations of 915 may be performed by a text string component as described with reference to FIGS. 6 through 8.

At 920, the analytical data store may generate a vector corresponding to each element of each generated set of text strings using a word embedding function to form the set of vectors. The operations of 920 may be performed according to the methods described herein. In some examples, aspects of the operations of 920 may be performed by a word embedding component as described with reference to FIGS. 6 through 8.

Figure 10:
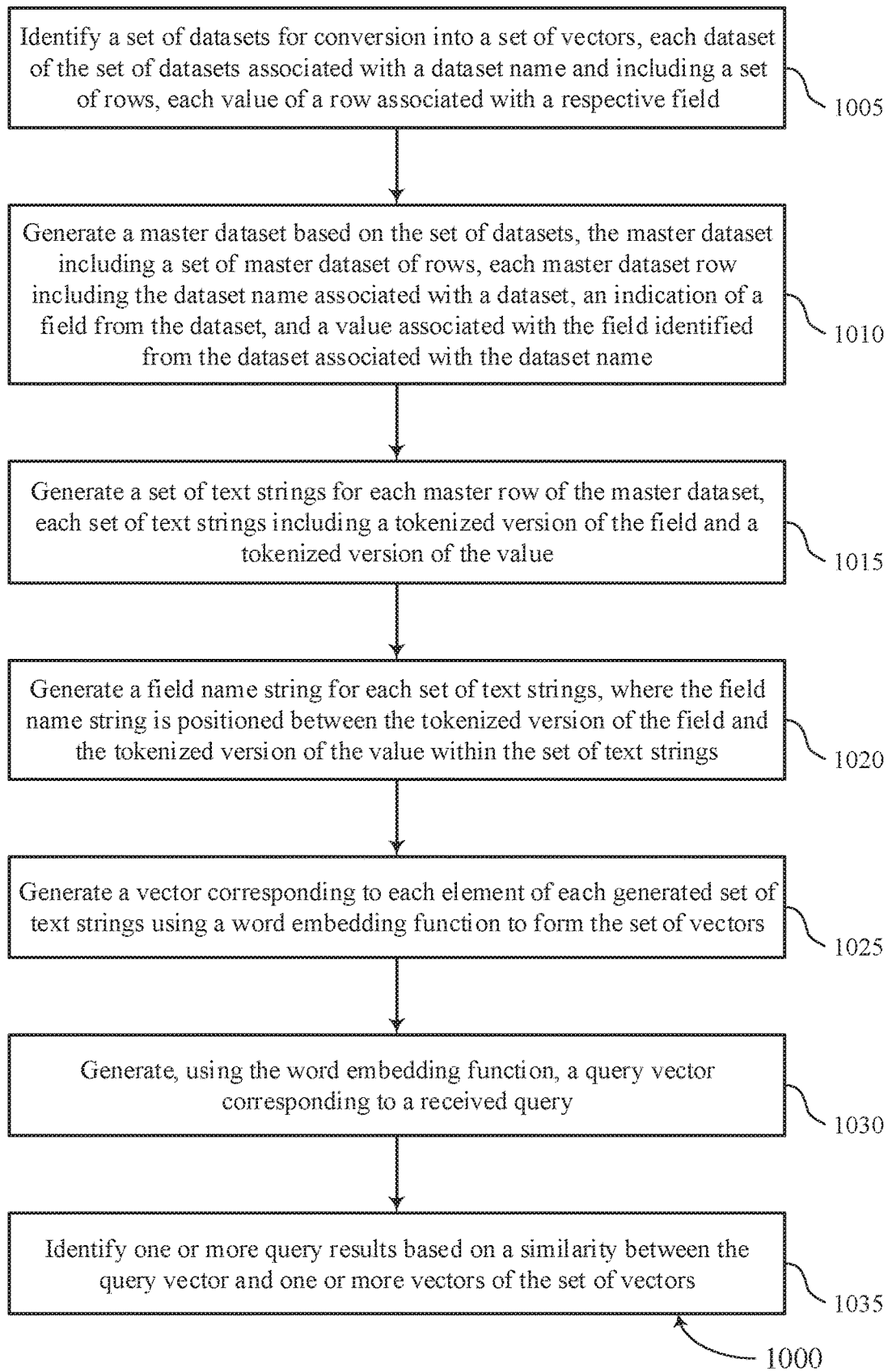

FIG. 10 shows a flowchart illustrating a method 1000 that supports learned data ontology using word embeddings from multiple datasets in accordance with aspects of the present disclosure. The operations of method 1000 may be implemented by an analytical data store or its components as described herein. For example, the operations of method 1000 may be performed by a data manager as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1005, the analytical data store may identify a set of datasets for conversion into a set of vectors, each dataset of the set of datasets associated with a dataset name and including a set of rows, each value of a row associated with a respective field. The operations of 1005 may be performed according to the methods described herein. In some examples, aspects of the operations of 1005 may be performed by a dataset identifier as described with reference to FIGS. 6 through 8.

At 1010, the analytical data store may generate a master dataset based on the set of datasets, the master dataset including a set of master dataset of rows, each master dataset row including the dataset name associated with a dataset, an indication of a field from the dataset, and a value associated with the field identified from the dataset associated with the dataset name. The operations of 1010 may be performed according to the methods described herein. In some examples, aspects of the operations of 1010 may be performed by a master dataset generation component as described with reference to FIGS. 6 through 8.

At 1015, the analytical data store may generate a set of text strings for each master row of the master dataset, each set of text strings including a tokenized version of the field and a tokenized version of the value. The operations of 1015 may be performed according to the methods described herein. In some examples, aspects of the operations of 1015 may be performed by a text string component as described with reference to FIGS. 6 through 8.

At 1020, the analytical data store may generate a field name string for each set of text strings, where the field name string is positioned between the tokenized version of the field and the tokenized version of the value within the set of text strings. The operations of 1020 may be performed according to the methods described herein. In some examples, aspects of the operations of 1020 may be performed by a text string component as described with reference to FIGS. 6 through 8.

At 1025, the analytical data store may generate a vector corresponding to each element of each generated set of text strings using a word embedding function to form the set of vectors. The operations of 1025 may be performed according to the methods described herein. In some examples, aspects of the operations of 1025 may be performed by a word embedding component as described with reference to FIGS. 6 through 8.

At 1030, the analytical data store may generate, using the word embedding function, a query vector corresponding to a received query. The operations of 1030 may be performed according to the methods described herein. In some examples, aspects of the operations of 1030 may be performed by a query component as described with reference to FIGS. 6 through 8.

At 1035, the analytical data store may identify one or more query results based on a similarity between the query vector and one or more vectors of the set of vectors. The operations of 1035 may be performed according to the methods described herein. In some examples, aspects of the operations of 1035 may be performed by a query component as described with reference to FIGS. 6 through 8.

Figure 11:
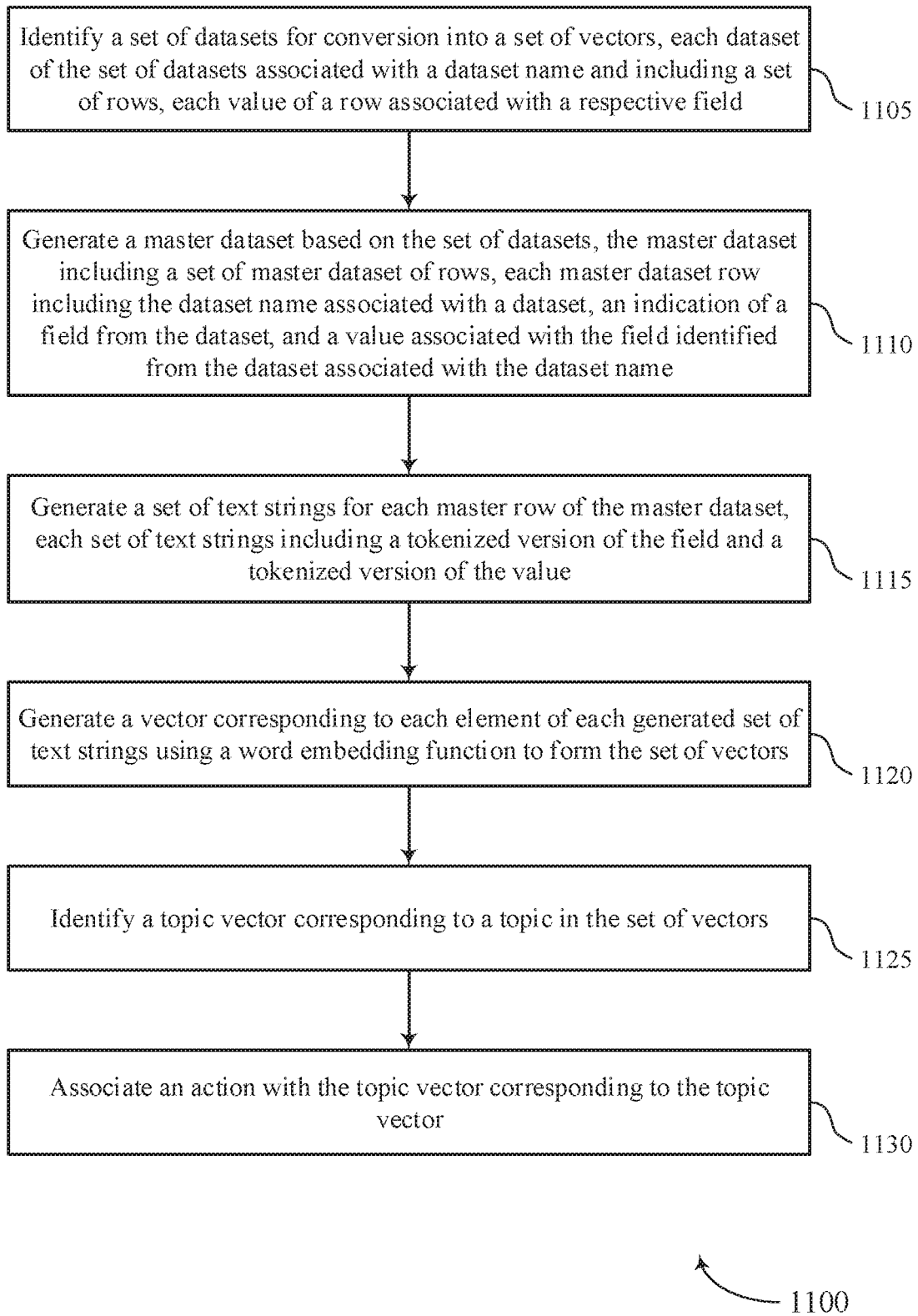

FIG. 11 shows a flowchart illustrating a method 1100 that supports learned data ontology using word embeddings from multiple datasets in accordance with aspects of the present disclosure. The operations of method 1100 may be implemented by an analytical data store or its components as described herein. For example, the operations of method 1100 may be performed by a data manager as described with reference to FIGS. 6 through 8. In some examples, an analytical data store may execute a set of instructions to control the functional elements of the analytical data store to perform the functions described herein. Additionally or alternatively, an analytical data store may perform aspects of the functions described herein using special-purpose hardware.

At 1105, the analytical data store may identify a set of datasets for conversion into a set of vectors, each dataset of the set of datasets associated with a dataset name and including a set of rows, each value of a row associated with a respective field. The operations of 1105 may be performed according to the methods described herein. In some examples, aspects of the operations of 1105 may be performed by a dataset identifier as described with reference to FIGS. 6 through 8.

At 1110, the analytical data store may generate a master dataset based on the set of datasets, the master dataset including a set of master dataset of rows, each master dataset row including the dataset name associated with a dataset, an indication of a field from the dataset, and a value associated with the field identified from the dataset associated with the dataset name. The operations of 1110 may be performed according to the methods described herein. In some examples, aspects of the operations of 1110 may be performed by a master dataset generation component as described with reference to FIGS. 6 through 8.

At 1115, the analytical data store may generate a sot of text strings for each master row of the master dataset, each set of text strings including a tokenized version of the field and a tokenized version of the value. The operations of 1115 may be performed according to the methods described herein. In some examples, aspects of the operations of 1115 may be performed by a text string component as described with reference to FIGS. 6 through 8.

At 1120, the analytical data store may generate a vector corresponding to each element of each generated set of text strings using a word embedding function to form the set of vectors. The operations of 1120 may be performed according to the methods described herein. In some examples, aspects of the operations of 1120 may be performed by a word embedding component as described with reference to FIGS. 6 through 8.

At 1125, the analytical data store may identify a topic vector corresponding to a topic in the set of vectors. The operations of 1125 may be performed according to the methods described herein. In some examples, aspects of the operations of 1125 may be performed by a topic component as described with reference to FIGS. 6 through 8.

At 1130, the analytical data store may associate an action with the topic vector corresponding to the topic vector. The operations of 1130 may be performed according to the methods described herein. In some examples, aspects of the operations of 1130 may be performed by an action component as described with reference to FIGS. 6 through 8.

A method of data processing is described. The method may include identifying a set of datasets for conversion into a set of vectors, each dataset of the set of datasets associated with a dataset name and including a set of rows, each value of a row associated with a respective field, generating a master dataset based on the set of datasets, the master dataset including a set of master dataset of rows, each master dataset row including the dataset name associated with a dataset, an indication of a field from the dataset, and a value associated with the field identified front the dataset associated with the dataset name, generating a set of text strings for each master row of the master dataset, each set of text strings including a tokenized version of the field and a tokenized version of the value, and generating a vector corresponding to each element of each generated set of text strings using a word embedding function to form the set of vectors.

An apparatus for data processing is described. The apparatus may include a processor, memory coupled with the processor, and instructions stored in the memory. The instructions may be executable by the processor to cause the apparatus to identify a set of datasets for conversion into a set of vectors, each dataset of the set of datasets associated with a dataset name and including a set of rows, each value of a row associated with a respective field, generate a master dataset based on the set of datasets, the master dataset including a set of master dataset of rows, each master dataset row including the dataset name associated with a dataset, an indication of a field from the dataset, and a value associated with the field identified front the dataset associated with the dataset name, generate a set of text strings for each master row of the master dataset, each set of text strings including a tokenized version of the field and a tokenized version of the value, and generate a vector corresponding to each element of each generated set of text strings using a word embedding function to form the set of vectors.

Another apparatus for data processing is described. The apparatus may include means for identifying a set of datasets for conversion into a set of vectors, each dataset of the set of datasets associated with a dataset name and including a set of rows, each value of a row associated with a respective field, generating a master dataset based on the set of datasets, the master dataset including a set of master dataset of rows, each master dataset row including the dataset name associated with a dataset, an indication of a field from the dataset, and a value associated with the field identified from the dataset associated with the dataset name, generating a set of text strings for each master row of the master dataset, each set of text strings including a tokenized version of the field and a tokenized version of the value, and generating a vector corresponding to each element of each generated set of text strings using a word embedding function to form the set of vectors.

A non-transitory computer-readable medium storing code for data processing is described. The code may include instructions executable by a processor to identify a set of datasets for conversion into a set of vectors, each dataset of the set of datasets associated with a dataset name and including a set of rows, each value of a row associated with a respective field, generate a master dataset based on the set of datasets, the master dataset including a set of master dataset of rows, each master dataset row including the dataset name associated with a dataset, an indication of a field from the dataset, and a value associated with the field identified from the dataset associated with the dataset name, generate a set of text strings for each master row of the master dataset, each set of text strings including a tokenized version of the field and a tokenized version of the value, and generate a vector corresponding to each element of each generated set of text strings using a word embedding function to form the set of vectors.

Some examples of the method, apparatuses, and non-transitory computer-readable medium described herein may further include operations, features, means, or instructions for generating, using the word embedding function, a query vector corresponding to a received query, and identifying one or more query results based on a similarity between the query vector and one or more vectors of the set of vectors.

In some examples of the method, apparatuses, and non-transitory computer-readable medium described herein, generating the master dataset may include operations, features, means, or instructions for including, within each master dataset row of the master dataset, an indication of a number of occurrences of the value in a respective dataset of the set of datasets.

In some examples of the method, apparatuses, and non-transitory computer-readable medium described herein, generating the set of text strings may include operations, features, means, or instructions for generating one or more copies of text string of the set of text strings based on the number of occurrences of the value.

In some examples of the method, apparatuses, and non-transitory computer-readable medium described herein, generating the set of text strings may include operations, features, means, or instructions for generating a field name string for each set of text strings, where the field name string may be positioned between the tokenized version of the field and the tokenized version of the value within the set of text strings.

Some examples of the method, apparatuses, and non-transitory computer-readable medium described herein may further include operations, features, means, or instructions for identifying a topic vector corresponding to a topic in the set of vectors, and associating an action with the topic vector corresponding to the topic vector.

Some examples of the method, apparatuses, and non-transitory computer-readable medium described herein may further include operations, features, means, or instructions for determining that a query vector corresponding to a received query satisfies a threshold similarity associated with the topic vector, and activating the action associated with the topic vector based on determining that the query vector satisfies the threshold similarity.

In some examples of the method, apparatuses, and non-transitory computer-readable medium described herein, associating the action may include operations, features, means, or instructions for associating a map visualization action with the topic vector that corresponds to a set of geographic locations, where the map visualization action triggers generation of a map when activated in response to a query vector satisfying a threshold similarity with the topic vector.

Some examples of the method, apparatuses, and non-transitory computer-readable medium described herein may further include operations, features, means, or instructions for associating a sales pipeline visualization action with the topic vector that corresponds to a set of sales stages, where the sales pipeline visualization action triggers generation of a sales pipeline visualization when activated in response to a query vector satisfying a threshold similarity with the topic vector.

In some examples of the method, apparatuses, and non-transitory computer-readable medium described herein, identifying the topic vector may include operations, features, means, or instructions for generating an input vector for each input of a set of inputs that correspond to the topic, and identifying the topic vector based on similarities between each input vector corresponding to the set of inputs.

In some examples of the method, apparatuses, and non-transitory computer-readable medium described herein, identifying the topic vector may include operations, features, means, or instructions for generating the topic vector using a field from one of the set of datasets.

In some examples of the method, apparatuses, and non-transitory computer-readable medium described herein, the action corresponds to a data visualization action.

In some examples of the method, apparatuses, and non-transitory computer-readable medium described herein, identifying the topic vector may include operations, features, means, or instructions for identifying the topic vector based on the set of datasets being associated with a first tenant of a multi-tenant database system that supports a set of tenants.

Some examples of the method, apparatuses, and non-transitory computer-readable medium described herein may further include operations, features, means, or instructions for receiving a new dataset including one or more columns, generating, for a column of the one or more columns and using the word embedding function, a set of value vectors that includes a value vector for each value in the column, calculating an averaae vector using each value vector of the set of value vectors, and identifying a relationship between the column and one or more columns of the set of datasets by identifying similarities between the average vector and one or more vectors of the set of vectors.

Some examples of the method, apparatuses, and non-transitory computer-readable medium described herein may further include operations, features, means, or instructions for receiving an indication of a relationship between a first field and a second field of the set of datasets, receiving a query that may be associated the first field based on a similarity between a query vector for the query and a vector that corresponds to the first field, and generating a query response to the query using one or more values that may be associated with the second field based on the relationship between the first field and the second field.

In some examples of the method, apparatuses, and non-transitory computer-readable medium described herein, identifying the set of datasets may include operations, features, means, or instructions for identifying the set of datasets that may be associated with a first tenant of a multi-tenant database systems that supports a set of tenants, where a separate set of vectors may be generated for each of one or more second tenants of the multi-tenant database system.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on".

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:
    generating a master dataset that includes data from a plurality of datasets, the master dataset comprising a plurality of rows that include a dataset name associated with a dataset of the plurality of datasets, an indication of a field from the dataset, a value corresponding to the field, and an indication of a number of occurrences of the value within the dataset of the plurality of datasets;
    generating a plurality of text strings for the plurality of rows in the master dataset, the plurality of text strings including a tokenized field string, a tokenized value string, and a non-tokenized field name string, wherein the non-tokenized field name string is positioned between the tokenized field string and the tokenized value string;
    generating a plurality of vectors associated with the master dataset by using a word embedding function to process the plurality of text strings;
    generating, using the word embedding function, a query vector corresponding to a received query; and
    executing the received query to retrieve query results from the master dataset, wherein retrieving the query results comprises determining that a cosine similarity between the query vector and at least one vector of the plurality of vectors satisfies a similarity threshold.

2. The method of claim 1, wherein generating the plurality of text strings comprises:
    generating one or more copies of a text string of the plurality of text strings based at least in part on the number of occurrences of the value.

3. The method of claim 1, further comprising:
    identifying a topic vector corresponding to a topic in the plurality of vectors; and
    associating an action with the topic vector corresponding to the topic.

4. The method of claim 3, further comprising:
    determining that the query vector corresponding to the received query satisfies a threshold similarity with respect to the topic vector; and
    activating the action associated with the topic vector based at least in part on determining that the query vector satisfies the threshold similarity.

5. The method of claim 3, wherein associating the action comprises:
    associating a map visualization action with the topic vector that corresponds to a set of geographic locations, wherein the map visualization action triggers generation of a map when activated in response to the query vector satisfying a threshold similarity with respect to the topic vector.

6. The method of claim 3, further comprising:
    associating a sales pipeline visualization action with the topic vector that corresponds to a set of sales stages, wherein the sales pipeline visualization action triggers generation of a sales pipeline visualization when activated in response to the query vector satisfying a threshold similarity with respect to the topic vector.

7. The method of claim 3, wherein identifying the topic vector comprises:
    generating input vectors for a set of inputs that correspond to the topic; and
    identifying the topic vector based at least in part on similarities between the input vectors corresponding to the set of inputs.

8. The method of claim 3, wherein identifying the topic vector comprises:
    generating the topic vector using a field from one of the plurality of datasets.

9. The method of claim 3, wherein the action corresponds to a data visualization action.

10. The method of claim 3, wherein identifying the topic vector comprises:
    identifying the topic vector based at least in part on the plurality of datasets being associated with a first tenant of a multi-tenant database system that supports a plurality of tenants.

11. The method of claim 1, further comprising:
    receiving a new dataset comprising one or more columns;
    generating, for the one or more columns and using the word embedding function, a set of value vectors;
    calculating an average vector for the set of value vectors; and
    identifying a relationship between the one or more columns of the plurality of datasets by identifying similarities between the average vector and the plurality of vectors.

12. The method of claim 1, further comprising:
    receiving an indication of a relationship between a first field and a second field in the plurality of datasets;
    associating a query with the first field based at least in part on a similarity between the query vector and a vector that corresponds to the first field; and
    generating a response to the query based at least in part on the relationship between the first field and the second field, wherein the response to the query associated with the first field comprises one or more values associated with the second field.

13. The method of claim 1, wherein identifying the plurality of datasets comprises:
identifying the plurality of datasets that are associated with a first tenant of a multi-tenant database system that supports a plurality of tenants, wherein a second plurality of vectors is generated for other tenants of the multi-tenant database system.

14. An apparatus for data processing, comprising:
a processor;
memory coupled with the processor; and
instructions stored in the memory and executable by the processor to cause the apparatus to:
generate a master dataset that includes data from a plurality of datasets, the master dataset comprising a plurality of rows that include a dataset name associated with a dataset of the plurality of datasets, an indication of a field from the dataset, a value corresponding to the field, and an indication of a number of occurrences of the value within the dataset of the plurality of datasets;
generate a plurality of text strings for the plurality of rows in the master dataset, the plurality of text strings including a tokenized field string, a tokenized value string, and a non-tokenized field name string, wherein the non-tokenized field name string is positioned between the tokenized field string and the tokenized value string;
generate a plurality of vectors associated with the master dataset by using a word embedding function to process the plurality of text strings;
generate, using the word embedding function, a query vector corresponding to a received query; and
execute the received query to retrieve query results from the master dataset, wherein, to retrieve the query results, the instructions are executable by the processor to cause the apparatus to determine that a cosine similarity between the query vector and at least one vector of the plurality of vectors satisfies a similarity threshold.

15. A non-transitory computer-readable medium storing code for data processing, the code comprising instructions executable by a processor to:
generate a master dataset that includes data from a plurality of datasets, the master dataset comprising a plurality of rows that include a dataset name associated with a dataset of the plurality of datasets, an indication of a field from the dataset, a value corresponding to the field, and an indication of a number of occurrences of the value within the dataset of the plurality of datasets;
generate a plurality of text strings for the plurality of rows in the master dataset, the plurality of text strings including a tokenized field string, a tokenized value string, and a non-tokenized field name string, wherein the non-tokenized field name string is positioned between the tokenized field string and the tokenized value string;
generate a plurality of vectors associated with the master dataset by using a word embedding function to process the plurality of text strings;
generate, using the word embedding function, a query vector corresponding to a received query; and
execute the received query to retrieve query results from the master dataset, wherein, to retrieve the query results, the instructions are executable by the processor to determine that a cosine similarity between the query vector and at least one vector of the plurality of vectors satisfies a similarity threshold.

16. The method of claim 1, wherein generating the plurality of vectors comprises: generating the plurality of vectors corresponding to the plurality of text strings based at least in part on using the word embedding function to identify word associations between adjacent elements of the plurality of text strings.

\* \* \* \* \*

UNITED STATES PATENT AND TRADEMARK OFFICE
CERTIFICATE OF CORRECTION

PATENT NO. : 11,675,764 B2  
APPLICATION NO. : 17/072615  
DATED : June 13, 2023  
INVENTOR(S) : Zheng et al.

Page 1 of 1

It is certified that error appears in the above-identified patent and that said Letters Patent is hereby corrected as shown below:

On the Title Page

Item (71), Applicant:, delete "salesforce.com, inc." and add ---Salesforce, Inc.---

Signed and Sealed this
Twenty-fifth Day of July, 2023

Katherine Kelly Vidal
*Director of the United States Patent and Trademark Office*